United States Patent [19]
Kakuma et al.

[11] Patent Number: 5,521,924
[45] Date of Patent: May 28, 1996

[54] TELEPHONE SUBSCRIBER ACCOMODATION SYSTEM IN A BROADBAND NETWORK

[75] Inventors: Satoshi Kakuma; Shuji Yoshimura; Naoyuki Izawa, all of Kawasaki, Japan

[73] Assignee: Fujitsu Limited, Kawasaki, Japan

[21] Appl. No.: 384,224

[22] Filed: Feb. 6, 1995

Related U.S. Application Data

[63] Continuation of Ser. No. 800,254, Nov. 29, 1991, abandoned.

[30] Foreign Application Priority Data

Nov. 30, 1990 [JP] Japan ................... 2-340141

[51] Int. Cl.$^6$ ................................... H04J 3/24
[52] U.S. Cl. ............................ 370/94.2; 370/110.1
[58] Field of Search ............... 370/110.1, 60.1, 370/94.2, 85.6, 84, 58.1–58.3, 68, 94.1, 60, 82, 83, 99; 359/47, 115; 340/825.5, 825.51, 895.52; 375/106, 118, 25, 112, 114

[56] References Cited

U.S. PATENT DOCUMENTS

| | | | |
|---|---|---|---|
| 4,595,907 | 6/1986 | Huffman et al. | |
| 5,051,983 | 9/1991 | Kammerl | 370/94.1 |
| 5,097,466 | 3/1992 | Kammerl | 370/94.1 |
| 5,170,395 | 12/1992 | Shinmyo | 370/110.1 |
| 5,327,421 | 7/1994 | Hiller et al. | 370/94.2 |
| 5,345,446 | 9/1994 | Hiller et al. | 370/94.2 |
| 5,375,118 | 12/1994 | Rao et al. | 370/60.1 |

FOREIGN PATENT DOCUMENTS

0225714  6/1987  European Pat. Off. .

OTHER PUBLICATIONS

Takahashi, et al., "A Broadband Switching System for Public Network", International Switching Symposium 90, vol. 5, pp. 103–109, May 1990, Stockholm, SE.

Graaf, et al., "The Performance of the IEEE 802.5 (IBM Token Ring) LAN in a Hybrid Voice and Date Environment", Proc. ISDN Europe/86, pp. 53–59, Basel, CH.

*Primary Examiner*—Benedict V. Safourek
*Assistant Examiner*—Ajit Patel
*Attorney, Agent, or Firm*—Staas & Halsey

[57] ABSTRACT

On receiving voice data from a subscriber accommodated in a broadband network, a terminal adaptor separately puts the voice data in cells in 8-bit units every 125 µs separately, and transmits the cells by a remote switching unit in the broadband network to subscriber terminal equipment. The subscriber terminal equipment accommodates and processes each item of 8-bit data in 24 channels in the PCM format, puts in cells the PCM-formatted data in 24 channels, and sends the cells sequentially to a broadband network transmission line through the remote switching unit. On receiving the above described data in cells, an adaptor provided between the broadband network and an existing telephone network converts the data to the PCM transmission format, and sends them to the existing telephone network after adding a signaling bit to them.

11 Claims, 8 Drawing Sheets

TELEPHONE SUBSCRIBER ACCOMODATION SYSTEM IN A BROADBAND NETWORK

This application is a continuation of application Ser. No. 07/800,254, filed Nov. 29, 1991, now abandoned.

BACKGROUND OF THE INVENTION

The present invention relates to a telephone subscriber accommodation system in a broadband network, and specifically to a technique for accommodating telephone subscribers in a broadband network where information is transmitted in a plurality of cells in an asynchronous transfer mode (ATM).

Figure 1:
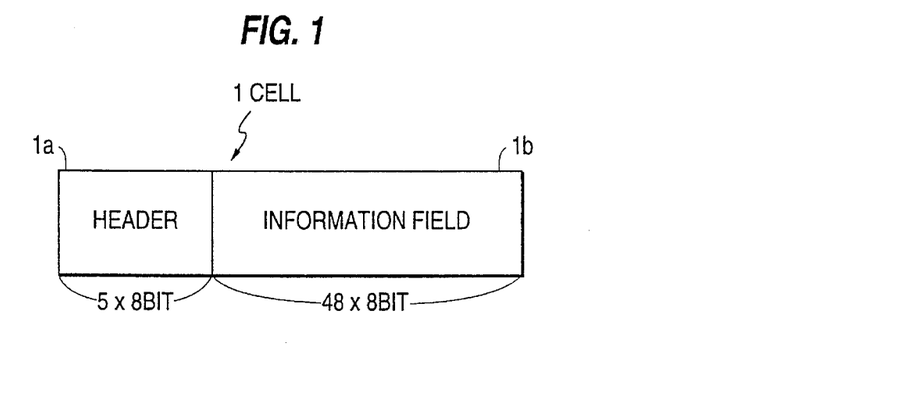
FIG. 1 is a view for explaining the format of a cell.

A broadband network (B-ISDN) transmits information in a plurality of cells in an asynchronous transfer mode (ATM), and features a unique method using the same network and the same signaling process in transmitting various kinds of information including broadband information such as data images, narrowband information as used for telephone communication, and burst information as used for data transmission. In this broadband network, user information is transmitted in fixed-length cells 1 whose structure is shown in FIG. 1, and the transmission speed can be shifted by modifying the number of cells assigned to one communication in a given unit of time. In this method, cell 1 comprises a 5-octet header part 1a and a 48-octet information field 1b.

Figure 2:
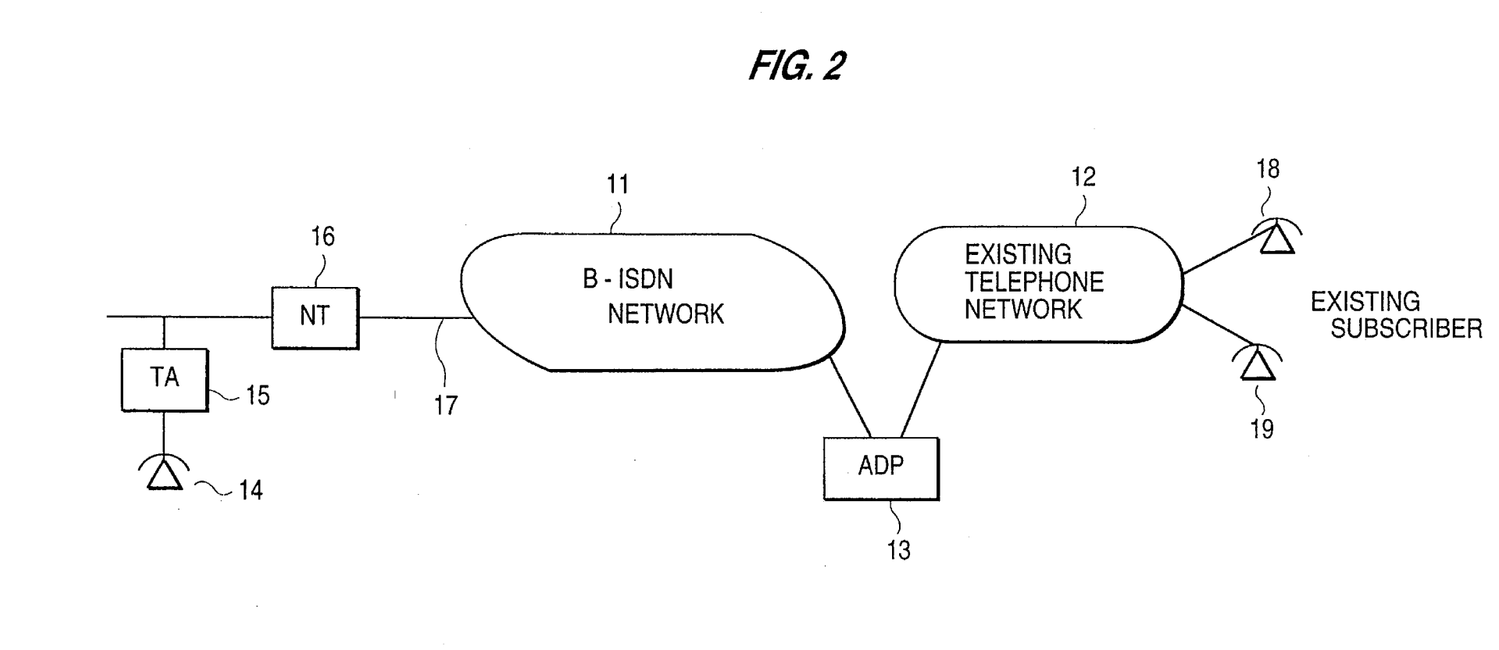
FIG. 2 is a view for explaining the accommodation of telephone subscribers.

In this broadband network, a communication must be conducted optionally between a telephone subscriber accommodated in the broadband network and a telephone subscriber accommodated in an existing telephone network. FIG. 2 shows a configuration in which a telephone subscriber is accommodated in a broadband network (B-ISDN). 11 is a broadband network. 12 is an existing telephone network. 13 is an adaptor (ADP) for connecting the broadband network to the existing telephone network. 14 is a telephone unit on the side of the broadband network (hereinafter referred to as a broadband subscriber). 15 is a terminal adaptor (TA) for converting voice data to transmit them in cells. 16 is a network terminator (NT1). 17 is a subscriber line. 18 and 19 are telephone units connected to an existing telephone network (hereinafter referred to as existing subscribers).

For a telephone subscriber, communication data are transmitted as 64 Kbps continuous data, and must be transmitted with only short delay.

The following two prior art technologies indicate how to transmit voice data, that is, communication data, in cells.

In the first prior art technology, voice data are put in a cell at a rate of 8 bits every 125 μs (a sampling cycle of voice data) and transmitted to the broadband network 11.

In the second prior art technology, voice data are divided into data of the size of the information field 1b (48×8 bits) of a cell before they are put into cells (refer to FIG. 1). Then they are transmitted in cells by the broadband network 11. That is, the second prior art has a configuration similar to that of a voice packet which is transmitted in a packet network.

In the above described first prior art technology, voice data are sent to the broadband network after being put in a cell at the rate of 8 bits every 125 μs in the terminal adaptor 15. That is, only 8 bits are used in the information field 1b of a cell (refer to FIG. 1), and the remaining 47×8 bits are transmitted as unoccupied. On receipt of a cell, the adaptor 13 (ADP)(refer to FIG. 2), which is an interface for the existing telephone network 12, converts a cell in a subscriber's transmission form in the existing telephone network. The converted voice data are accommodated in a circuit equivalent to a subscriber interface circuit in the existing telephone network 12, and processed as a subscriber in this network.

In the first prior art technology described above, the delay time during the transmission of information in the broadband network 11 is kept short, and the terminal adaptor 15 only has to transmit to the broadband network after putting voice data in a cell at the rate of 8 bits every 125 μs (or process in the reverse order). Therefore, the configuration is very simple. However, only 8 bits are used in an information field of a cell, and the remaining 47×8 bits are reversed as unocuppied. Therefore, an actual band in use in the communication line in the broadband network is not equal to 64 Kbps, but amounts to 64 Kbps×48=2.87 Kbps. This is the problem of the first prior art technology.

In the second prior art technology, voice data are transmitted to the broadband network 11 after being put in cells in 48×8-bit units by a terminal adaptor. Cells that are transmitted and converted in the broadband network 11 are converted again in the transmission form of the existing telephone network subscriber in the adaptor 13, interfaced for the existing telephone network 12 as described in the first prior art technology, and processed as a subscriber in the existing telephone network 12.

However, in the above described second prior art technology, although the occupied band in the communication line in the broadband network 11 amounts to only 64 Kbps, a buffer is required for the adaptor 13 and the terminal adaptor 15, thus complicating its configuration and causing a problem that the delay may be extended.

Furthermore, in the above described first and second prior art technologies, a user has to use a circuit, as an interface for the existing telephone network 12, similar to that used by subscribers of the existing telephone network. Therefore, the capacity of a switching unit in the existing telephone network is enlarged in proportion to the increasing number of subscribers to be provided with services.

SUMMARY OF THE INVENTION

The present invention has been developed based on the above described background. Its communication line occupies a band of 64 Kbps in a broadband network, and its terminal adaptor can be designed in a simplified configuration. Another object of the present invention is to provide a short-delay accommodation system for telephone subscribers in a broadband network.

The present invention relates to a telephone subscriber accommodation system for accommodating telephone subscribers in a broadband network in which information is transmitted in cells in an asynchronous transfer mode.

First, voice data of a subscriber accommodated in the broadband network are divided and put into cells at every predetermined sampling cycle, and the cells are sent by a terminal adaptor over the broadband network.

Next, each of the voice data samples stored in each cell from a plurality of subscribers accommodated in the broadband network is accommodated at every predetermined sampling cycle. Samples of these voice data are multiplexed for the number of subscribers and stored in a cell. The cell is then sent by a subscriber terminal equipment over the broadband network.

The present invention also includes a network adaptor unit provided between the broadband network and an existing telephone network. This unit is for extracting a signal obtained by multiplexing voice data from the cells sent over by subscriber terminal equipment through the broadband network, for converting the format of the signal to the transmission format of an existing telephone network, etc., and for sending the converted signal to the existing telephone network. If the existing network is operated in the PCM transmission format, the network adaptor unit converts the format of a signal to the PCM transmission format of the existing telephone network by extracting the signal obtained by multiplexing voice data from the cells sent by the subscriber terminal equipment through the broadband network, and by adding a signaling bit to the signal.

In the above described configuration of the present invention, the following items are added.

The network adaptor unit also puts in cells a signal obtained by multiplexing voice data in the transmission format of the existing telephone network sent therefrom, and then sends the cells to the broadband network. If the existing telephone network is operated in the PCM transmission format, the network adaptor unit removes the signaling bit from the signal obtained by multiplexing the voice data in the PCM transmitting format of the existing telephone network sent therefrom, and then puts the multiplexed signal in cells.

Next, the subscriber terminal equipment isolates a sample of each of the voice data addressed for a plurality of subscribers accommodated in the broadband network from cells sent by the network adaptor unit through the broadband network, puts the isolated sample of each of voice data in a cell separately at every predetermined sampling cycle, and sends it to a plurality of subscribers accommodated in the broadband network.

The terminal adaptor unit extracts a sample of voice data from cells sent by the subscriber terminal equipment through the broadband network at every predetermined sampling cycle, and sends it to subscribers accommodated in the terminal adaptor unit.

Thus, a band occupied by voice data in the broadband network can be compressed by multiplexing voice data for a plurality of subscribers and then putting them in a cell using the subscriber terminal equipment, thus shortening the delay in the network.

The terminal adaptor unit can be designed in a simple configuration because, as in the prior art technology, it only has to send voice data in the broadband network after putting them in cells sequentially at every predetermined sampling cycle (or to process the voice data in reverse order).

Additionally, cells containing multiplexed voice data for a plurality of subscribers can be easily interfaced for an existing telephone network by adding the inserting or extracting function of a signaling bit to a network adaptor.

BRIEF DESCRIPTION OF THE DRAWINGS

Other objects and features of the present invention can be easily recognized from the attached drawings and the description of embodiments of the present invention.

DESCRIPTION OF THE PREFERRED EMBODIMENTS

Explanation of the Principle

Figure 3:
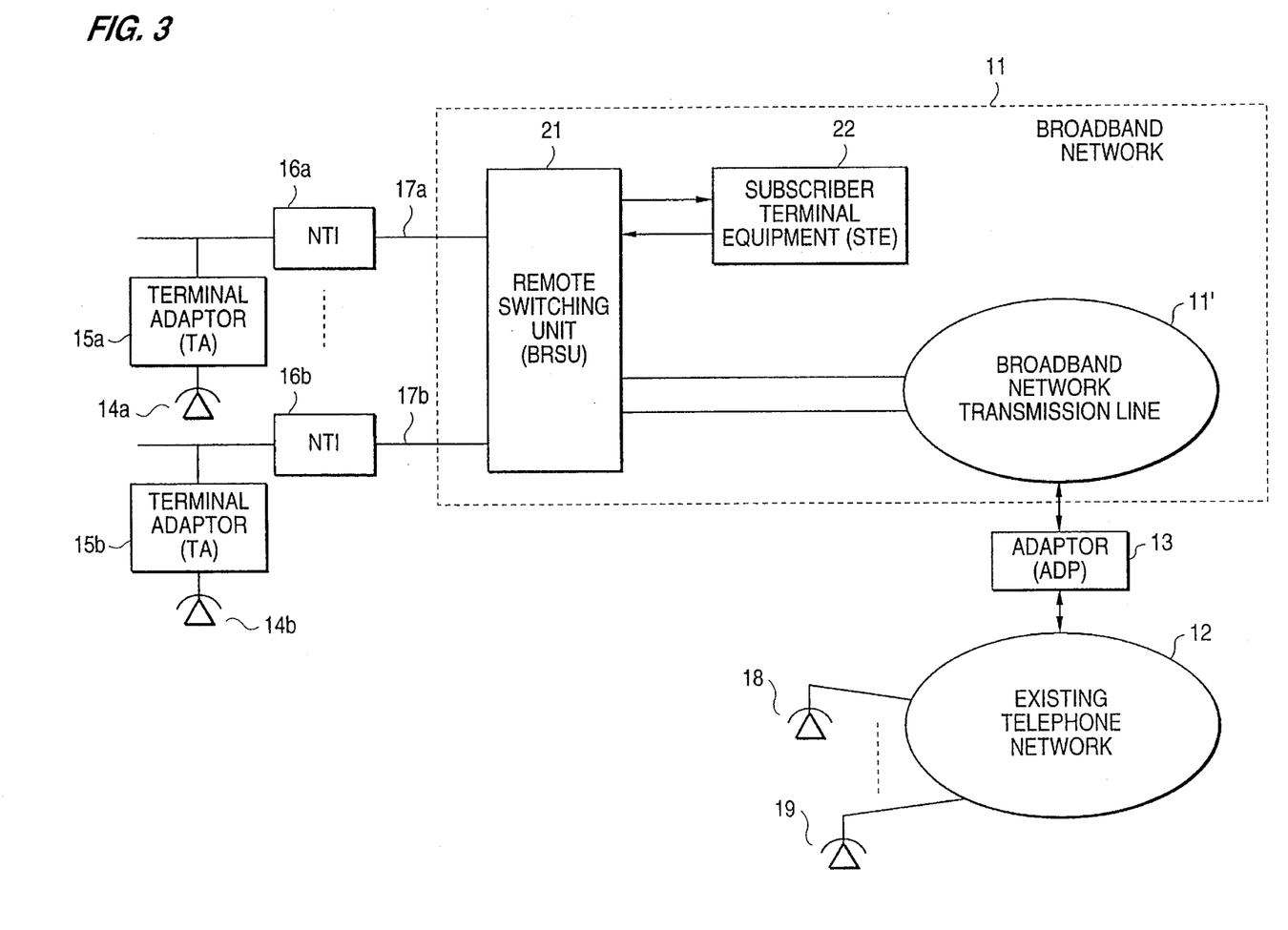
FIG. 3 is a view for explaining the principle of the present invention.

FIG. 3 shows a view for explaining the principle of the present invention.

11 is a broadband network. 12 is an existing telephone network. 13 is an adaptor (ADP) provided between the broadband network 11 and the existing telephone network 12. 14a and 14b are telephone units in the broadband network (hereinafter referred to as broadband subscribers). 15a and 15b are terminal adaptors (TA) for putting voice data in a cell at the rate of 8 bits every 125 μs. 16a and 16b are network terminal units. 17a and 17b are subscriber lines. 18 and 19 are telephone units in the existing telephone network 12 (hereinafter referred to as existing subscribers). 21 is a remote switching unit in a broadband network (BRSU:B-ISDN remote switching unit) for accommodating (collecting) a number of subscriber lines. 22 is an item of subscriber terminal equipment (STE) connected to the remote switching unit 21. It is for accommodating each of 8-bit data in N predetermined channels for the cells provided by a number of subscribers, processing these accommodated data in N channels to the PCM-transmission-formatted data, putting these PCM-formatted data in N channels into cells sequentially, and sending the cells to the broadband network 11.

When voice data are provided by the broadband subscribers 14a and 14b to be accommodated in a broadband network, the terminal adaptors 15a and 15b put 8 bits of voice data in a cell at predetermined time intervals T (125 μs) and apply them to the remote switching unit 21 in the broadband network 11 through the network terminal units 16a and 16b, and the subscriber lines 17a and 17b. In this process, only 8 bits in each information field of a cell are used, retaining the remaining 47×8 bits as unoccupied.

The remote switching unit 21 sets a logical path by assigning a virtual channel number to each of the inputted cells, and outputs each cell to the subscriber terminal equipment 22. The subscriber terminal equipment 22 accommodates and PCM-formats each of the 8-bit data in N channels (for example, 24 channels) assigned to it and inputted at every predetermined time interval T (=125 μs), puts these PCM-formatted data sequentially in N channels in cells, and sends them to broadband network transmission line 11' through the remote switching unit 21.

On receiving data in a cell, the adaptor 13 provided between the broadband network 11 and the existing telephone network 12 converts the format of these data into the PCM transmission format, adds a signaling bit to them, and sends them to the existing telephone network 12.

When receiving data in the PCM transmission format from the existing telephone network 12, the adaptor 13 removes signaling bits from the data in the PCM transmission format and sends them in cells to the broadband network 11. On receiving the cell containing multiplexed and PCM-formatted data, the subscriber terminal equipment 22 retrieves the PCM-formatted data in N channels stored in the cells, stores each unit of 8-bit data in its memory, puts each unit of 8-bit data in a cell separately, and then sends it to the predetermined subscriber lines 17a and 17b through the remote switching unit 21. Each of these units of 8-bit data stored separately in a cell is received by the terminal adaptors 15a and 15b, and transmitted to the broadband subscribers 14a and 14b.

Thus, the occupied band of voice data in the broadband network 11 can be reduced to 64 Kbps for one channel with a short delay by connecting the subscriber terminal equipment 22 to the remote switching unit (BRSU) 21 for terminating broadband subscribers, multiplexing subscriber data (voice data) in a plurality of channels in the PCM transmission format, and putting them in cells.

In this case, the terminal adaptors 15a and 15b can be designed in a simple configuration because they only have to put voice data in a cell sequentially at a rate of 8 bits every 125 μs as described in the first prior art technology, and send it to a broadband network (or to process in reverse order).

Additionally, the cells containing the multiplexed PCM data for a plurality of subscribers can be easily interface for the existing telephone network 12 by adding the inserting and extracting functions of a signaling bit to the adaptor (ADP) 13.

Explanation of Embodiments

Total Configuration

Figure 4:
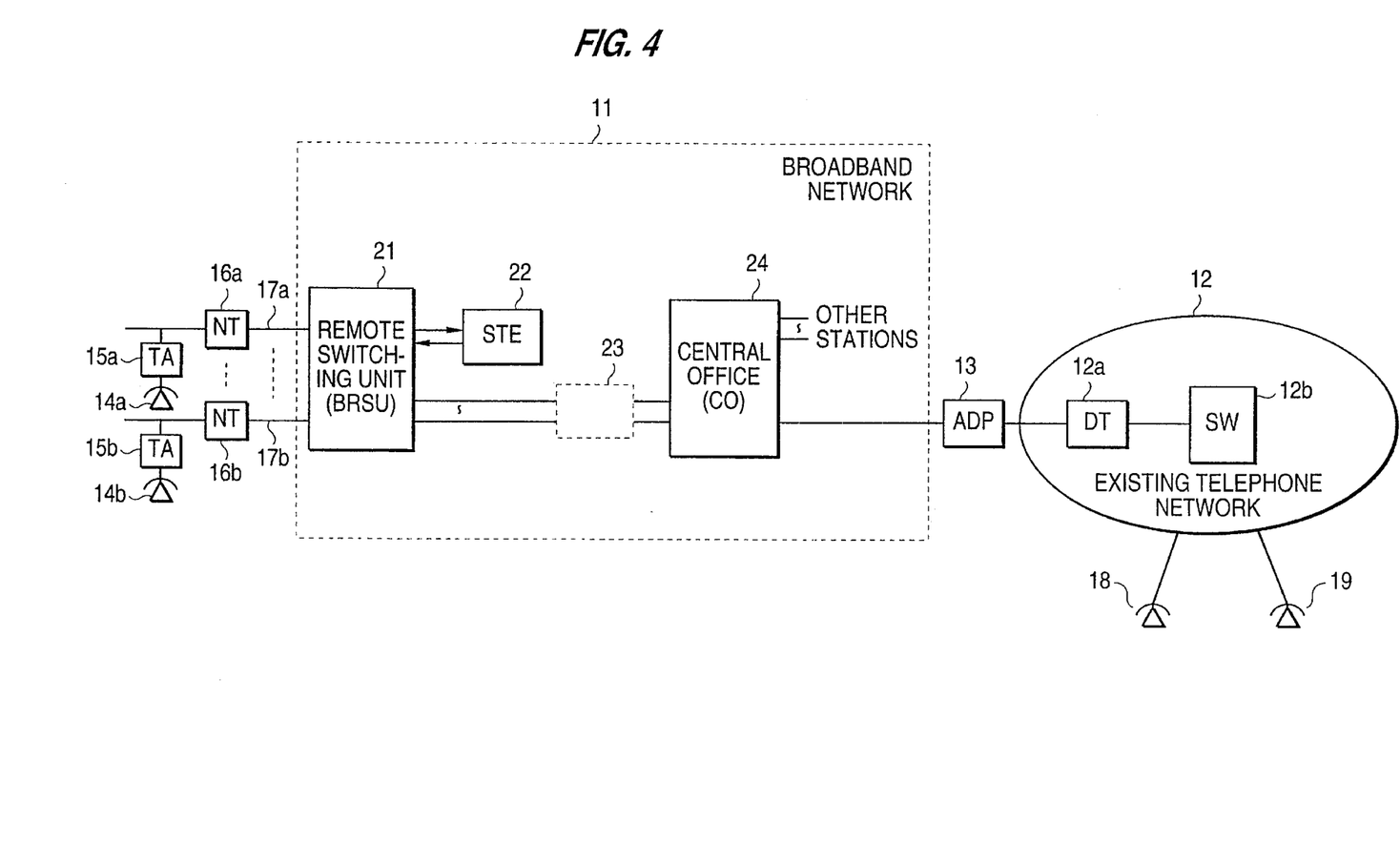
FIG. 4 is a configurational view of an embodiment of the present invention.

FIG. 4 shows the total configuration of an embodiment of the present invention with the corresponding symbols assigned to the parts described in FIG. 3. This embodiment is provided with a PCM transmission interface of 1.544 Mbps or 2.048 Mbps.

11 is a broadband network where information in cells are transmitted in the asynchronous transfer mode (ATM). 12 is an existing telephone network. 13 is an adaptor (ADP) provided between the broadband network 11 and the existing telephone network 12. 14a and 14b are broadband subscribers which are telephone units accommodated in the broadband network. 15a and 15b are terminal adaptors for sending, to the network side, voice data sent from the broadband subscribers 14a and 14b at 64 Kbps after putting 8 bits of voice data in a cell at predetermined time intervals (for example, 125 μs), and conversely for converting data in cells sent from the network into voice data of 64 Kbps to send them to the broadband subscribers 14a and 14b. 16a and 16b are network terminal units which connect a number of terminal adaptors to each network terminal unit. 17a and 17b are subscriber lines for transmitting data at a transmission speed of 155 Mbps or 622 Mbps. 18 and 19 are existing subscribers, that is, telephone units, in the existing telephone network 12. In the existing telephone network 12, 12a is a digital terminal, that is, an interface in a digital line, and 12b is a switching unit (SW).

Broadband Network

In the broadband network 11, 21 is a remote switching unit in a broadband network (BRSU) for accommodating (collecting) a number of subscriber lines. 22 is a unit of subscriber terminal equipment (STE) connected to the remote switching unit 21. 23 is a broadband transmission system. 24 is a central office (switching unit CO).

The remote switching unit 21 outputs cells provided by the subscribers 17a, 17b, . . . , and the transmission system 23 to the subscriber terminal equipment 22, and sends data in cells provided by the subscriber terminal equipment 22 to the transmission system 23 or the subscribers 17a, 17b, . . .

The subscriber terminal equipment 22 collects subscribers (data) accommodated in the remote switching unit 21, and multiplexes them to those in the digital transmission format to be used in the inter-station communication in the existing telephone network 12. The transmission rate is 1.544 Mbps (in PCM 24 channel multiplexing) or 2.04 Mbps (PCM 30 channel multiplexing). That is, the subscriber terminal equipment 22 accommodates every 125 μs each of 8-bit data in N predetermined channels (24 or 30 channels) of cells provided by the subscriber lines 17a and 17b, processes the accommodated data in the N channels to the PCM-formatted data, sequentially puts the PCM-formatted data in the N channels into cells each comprising a 5-octet header part and a 48-octet information field, and then sends the cells to the remote switching unit 22. On receiving the cells containing multiplexed PCM-formatted data from the transmission system 23, the subscriber terminal equipment 22 retrieves PCM-formatted data in N channels stored in the cells, accommodates each unit of 8-bit data in its memory, puts data in a cell in 8 bits separately, and then sends them to the predetermined subscriber 17a, 17b, . . . through the remote switching unit 21.

The transmission system 23 forms the No. 7 common channel signaling system (CCS7) where a plurality of transmission lines share a signal line, switches PCM format data in cells, and sends them to the adaptor 13 for interfacing for the existing telephone network 12.

In this embodiment, the number of transmission lines between the remote switching unit 21 and the central office 24 (BRSU-CO) and between the central offices 24 (CO—CO), and the band of each communication line in the remote switching unit 21 and the central office 24 are set to the minimum possible value to improve the efficiency of the broadband network 11. The number of subscriber lines 17 to be accommodated depends on the usage condition of the subscribers 14, and an appropriate band is determined between the subscriber 14 and the remote switching unit 21.

Adaptor

The adaptor 13 is a circuit for connecting the broadband network 11 to the existing telephone network 12. It converts data in cells provided by the broadband network 11 to those in the transmission format (for example, the PCM transmission format) in the existing telephone network 12, and interfaces to the existing telephone network 12. That is, on receiving PCM data in cells from the broadband network 11, the adaptor 13 extracts the PCM transmission formatted data from these data in cells, and transmits them to the existing telephone network 12 with a signaling bit added to the eighth bit in every sixth frame. When receiving the PCM transmission formatted data from the existing telephone network 12, the adaptor 13 removes the signaling bit from the eighth bit added to every sixth frame, puts those data in cells, and send them to the broadband network 11.

Configuration of Subscriber Terminal Equipment

Figure 5:
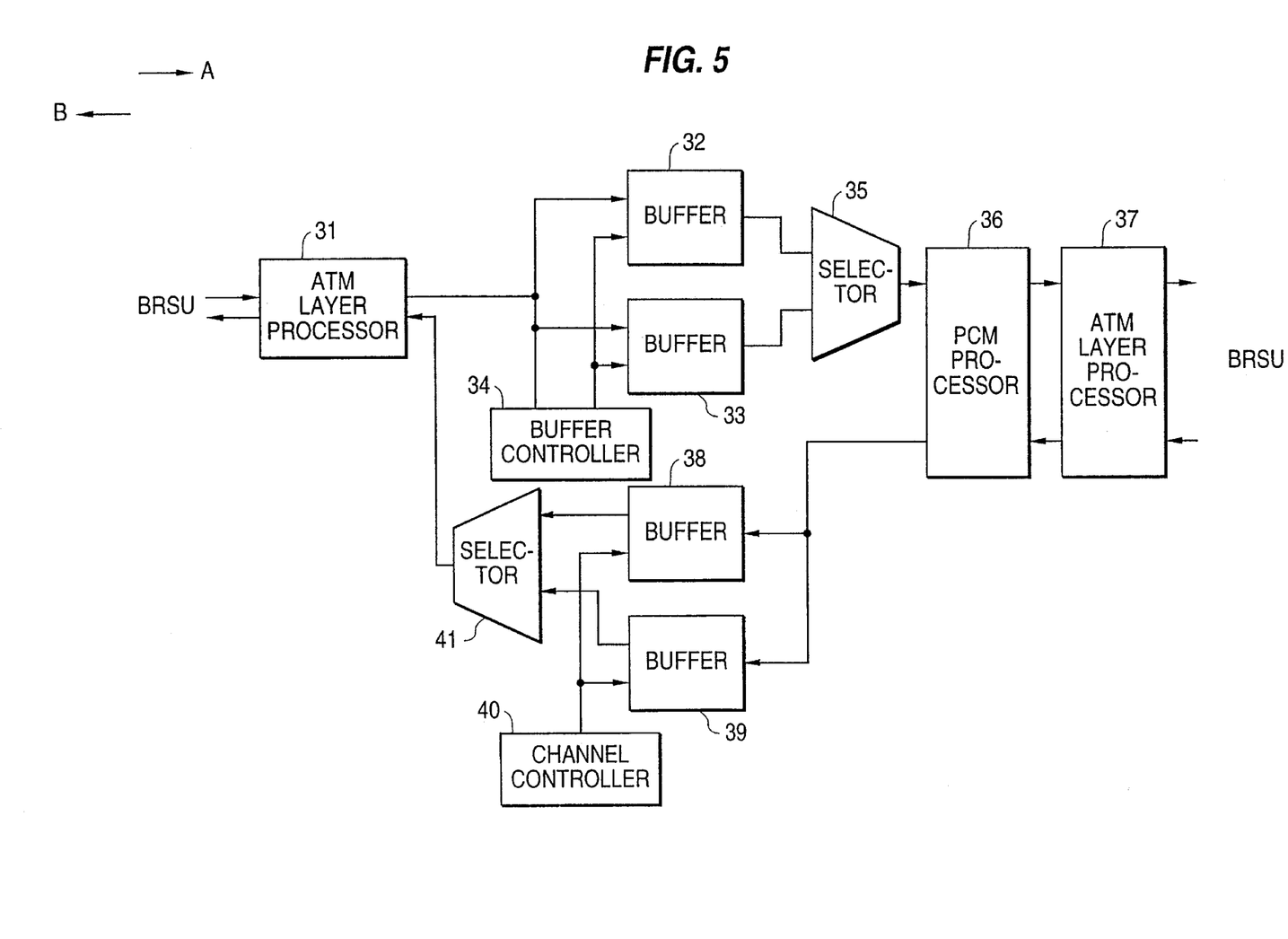
FIG. 5 is a configurational view of a circuit of a subscriber terminal.

FIG. 5 shows the configuration of an embodiment of the subscriber terminal equipment 22 shown in FIG. 4.

In FIG. 5, in the operation in the direction indicated by arrow A, data are separately accommodated in a cell in 8 bits, which are provided by the subscriber lines 17a, 17b, . . . through the remote switching unit 21, for N (=24 or 30) channels. The accommodated data are processed to the PCM formatted data, and the data are put in cells again and are then sent to the transmission system 23. In the operation in the direction indicated by arrow B, the PCM-formatted data in the N channels stored in the cells transmitted from the transmission system 23 through the remote switching unit 21 are retrieved, data in 8-bit units are accommodated in its memory, and data in 8-bit units are put separately into a cell and sent to the predetermined subscriber lines 17a, 17b, . . . through the remote switching system 21.

in FIG. 5, 31 is an ATM layer processor. When data in a cell are provided from the remote switching unit (BRSU) 21, ATM layer processor 31 analyzes the header of the cell to identify a channel and outputs each unit of 8-bit data stored in an information field of a cell to a buffer corresponding to the identified channel. When each unit of 8-bit data is provided from a selector 41, it is put in a cell and outputted to the remote switching unit (BRSU) 21.

32 and 33 are the first and second buffers for alternately switching the write and read operation every 125 s, storing data in 8-bit units in N (=24 or 30) channels in 125 µs during the writing operation, reading 8-bit data in N (=24 or 30) channels in 125 µs during the reading operation, and then outputting them to the following circuit.

34 is a buffer controller, that is, a control circuit for permitting the first and second buffers 32 and 33 to write and read data alternately.

35 is a selector for selecting data read from a buffer, converting them to PCM 24-channel multiplexed data, and then outputting them.

36 is a PCM processor for outputting PCM 24-channel multiplexed data after adding a synchronizing bit to them during the operation in the A direction, and for removing the synchronous bit from the PCM 24-channel multiplexed data to divide them into 8-bit units of data during the operation in the B direction.

37 is an ATM layer processor for outputting the PCM data provided by the PCM processor 36 after putting them into cells, and releases the PCM data provided by the remote switching unit (BRSU) 21 from the cells (refer to FIG. 4).

38 and 39 are the third and the fourth buffers for alternately switching write and read operations every 125 µs, storing data in 8-bit units in 24 channels provided by the PCM processor 36 in 125 s during the writing operation, reading each 8-bit units of data in 24 channels in 125 µs during the reading operation, and then outputting them to the following circuit.

40 is a channel controller, that is, a control circuit for permitting the third and fourth buffers 38 and 39 to alternately write and read data.

41 is a selector for applying each 8-bit units of data read from the third and the fourth buffers to the ATM layer processor 31.

Configuration of an Adaptor

Figure 6:
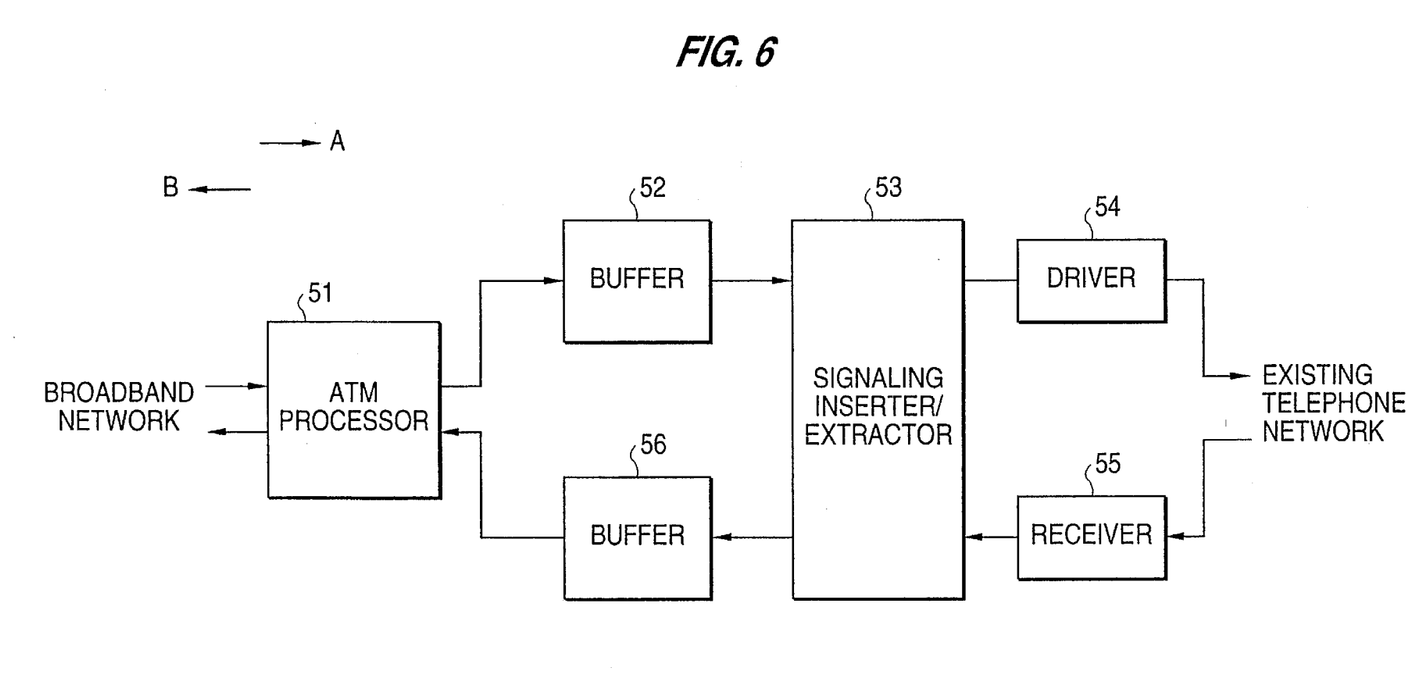
FIG. 6 is a configurational view of an adaptor.

FIG. 6 shows the configuration of an embodiment of the adaptor 13. In the operation in the direction indicated by arrow A, data are transmitted from the broadband 11 to the existing telephone network 12, and in the operation in the direction indicated by arrow B, data are transmitted from the existing telephone network 12 to the broadband network 11.

In FIG. 6, 51 is an ATM layer processor. When data are transmitted in the direction indicated by arrow A, the PCM data provided by the broadband network 11 are released from their cells and outputted in 8-bit units. When data are transmitted in the direction indicated by arrow B, the PCM data provided by the existing telephone network 12 are put in cells to be transmitted to the broadband network 11.

52 is a buffer for storing PCM data which are released from their cells and for outputting them at a speed of 1.54 Mbps.

53 is a signaling inserter/extractor. When data are transmitted in the direction indicated by arrow A, a signaling bit is inserted into the eighth bit of every 6th frame of PCM data. When data are transmitted in the direction indicated by arrow B, the signaling bit is removed from the eighth bit in every 6th frame of PCM data provided by the existing telephone network 12.

54 is a driver, and 55 is a receiver.

56 is a buffer for storing PCM data in 8-bit units after signaling bits are removed.

Total Operation

The telephone subscribers 14a, 14b . . . accommodated in the broadband network 11 (refer to FIG. 4) issue a call according to a communication protocol of the link access procedure in the D-channel (LAPD) when synchronization is established. After detecting an issuance of a call, a network sets a path in the remote switching unit (BRSU) 21 by assigning a virtual channel number to the subscriber (issuer), and then accommodates the data (voice data) of the subscriber in the subscriber terminal equipment (ATE) 22. A channel number assigned to each subscriber is notified in the transmission format of No. 7 common channel signaling system (CCS7) from the transmission system 23 in the broadband network 11 to the central office (CO) 24, etc.

On receiving data in cells from a subscriber, the subscriber terminal equipment 22 analyzes the header of the cell to identify its channel, and writes 8-bit data stored in the information field of the cell to a buffer corresponding to the identified channel.

Data in a buffer in the subscriber terminal equipment 22 are read every 125 µs, converted to the PCM transmission frame format, put in cells, and then transmitted to the transmission system 23 in the broadband network. In the reverse operation, the above described processes are performed in reverse order.

Cell data are multiplexed in the PCM transmission format, transmitted from the remote switching unit (BRSU) 21 to the central office (CO) 24, and then applied to the adaptor 13 (ADP) using a logical path in the central office (CO) 24.

The adaptor (ADP) 13 extracts the multiplexed data in the PCM transmission format, converts them to the corresponding transmission sign level, and then sends them to the existing telephone network 12. In the reverse operation, the above described processed are performed in reverse order.

Call information issued through a communication protocol of the LAPD from a subscriber is terminated by the remote switching unit (BRSU) 21, and information relating to correspondents' telephone numbers, etc. is given in the transmission format of No. 7 common channel signaling system (CCS7) from the remote switching unit (BRSU) 21 to the central office (CO) 24 through the transmission system 23.

Since a switching station for providing an interface between the broadband network 11 and the existing telephone network 12 has a broadband switching module and an existing telephone switching module in the same station, information communicated among subscribers is transmitted among the control systems.

Additionally, cells containing PCM data for a plurality of subscribers can be easily interface for an existing telephone network by adding the insertion and extraction function of a signaling bit to the adaptor 13.

Transmission of Communication Data from a Broadband Subscriber to an Existing Subscriber On receiving voice data from the broadband subscribers 14a, 14b, . . . , the terminal adaptors 15a and 15b put voice data in 8-bit units separately into a cell every 125 µs as described in the first prior art technology, and apply it to the B-ISDN remote switching unit (BRSU) 21 through the subscriber line 17a, 17b, . . .

Figure 7:
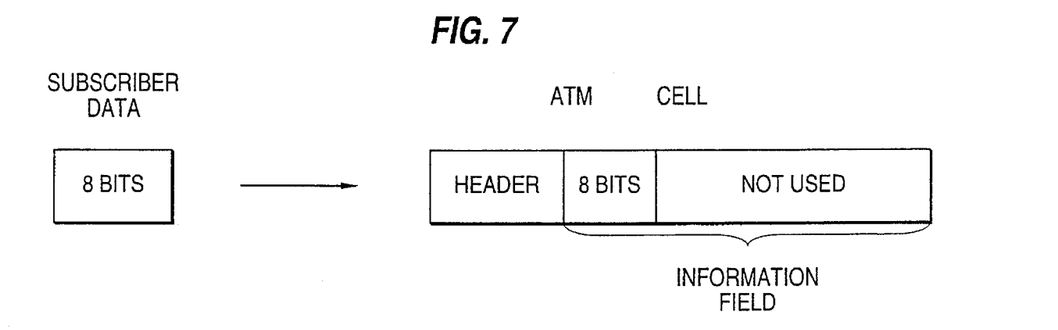
FIG. 7 shows a data format of a subscriber.

FIG. 7 shows the relation between subscriber data and a data format. As shown in FIG. 7, each sample of voice data comprising a plurality of 8-bit data is stored in a cell separately on the side of a subscriber.

The remote switching unit (BRSU) 21 assigns a virtual channel number to each of the inputted cells, sets its internal path, and transmits it to the subscriber terminal equipment (ATE) 22.

Figure 8A:
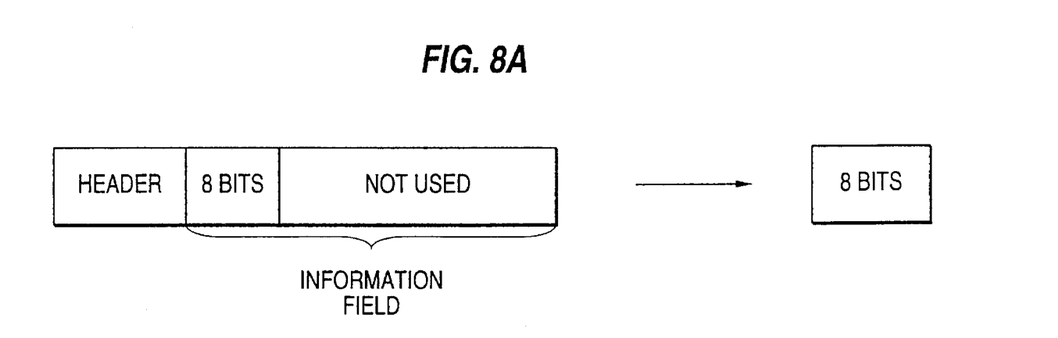
FIGS. 8A, 8B, and 8C show data formats of subscriber terminal equipment.

The subscriber terminal equipment 22 extracts each 8-bit unit of data in N channels (for example, 24 channels) as shown in FIG. 8A.

Figure 8B:
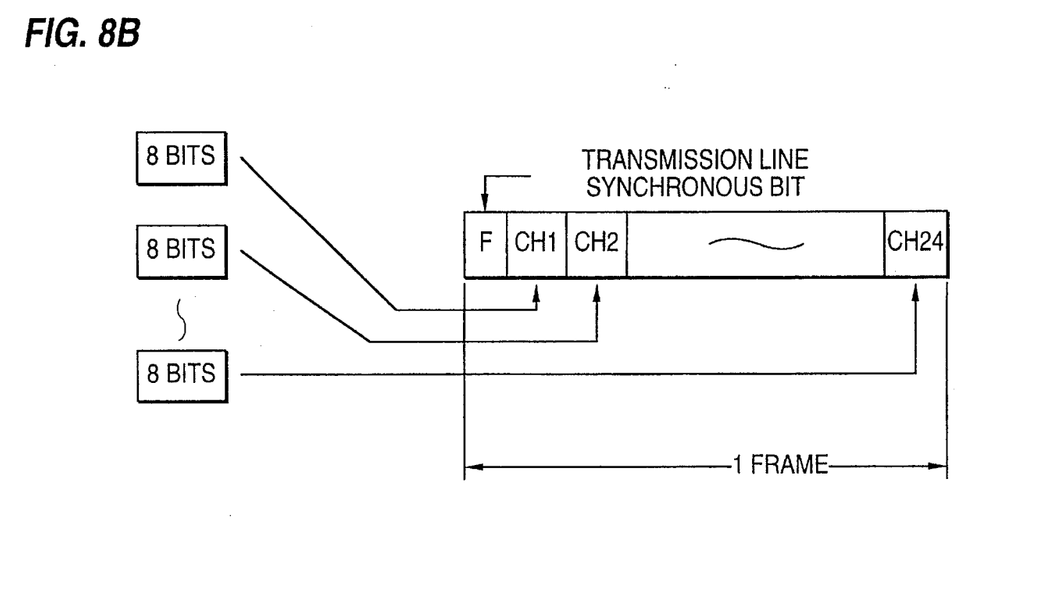

Then, the subscriber terminal equipment 22 maps each 8-bit unit of data of each subscriber extracted as described above to each channel in the PCM transmission format. FIG. 8B shows the state of the mapping described above. As shown in FIG. 8B, N=24 subscribers, for example, are mapped to N=24 channels in the PCM transmission format, thus forming 1 frame in the PCM transmission format. Then, one synchronous bit is added to the head of one frame comprising 24 channels. The subscriber terminal equipment 22 sequentially generates these frame data.

Figure 8C:
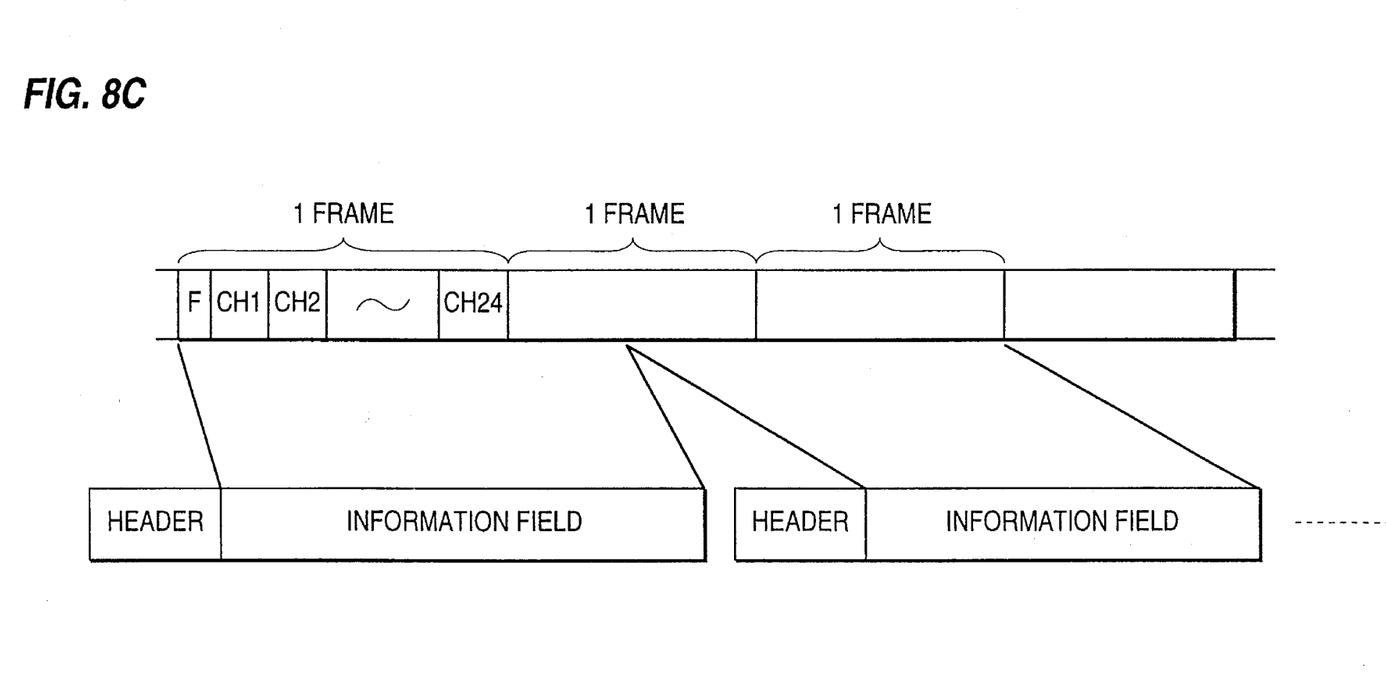

Furthermore, the subscriber terminal equipment 22 sequentially stores the PCM data in N channels, which are obtained from the above described mapping operation in amounts for an information field (for example, in 48 bytes) into information fields of cells as shown FIG. 8C. The resultant cells are sent to the B-ISDN transmission system 23 through the remote switching unit 21.

Figure 9:
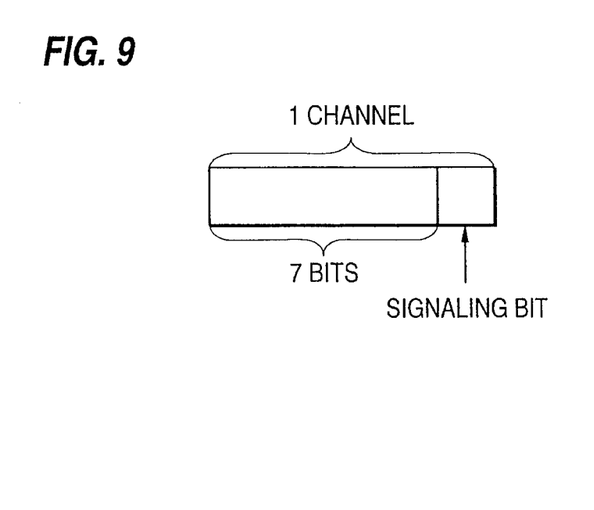
FIG. 9 shows the data format of an adaptor.

On receiving data in cells from the central office (CO) 24, the adaptor 13 provided between the broadband network 11 and the existing telephone network 12 extracts PCM-transmission-format data from the data in cells by removing the header parts from the cells, adds a signaling bit to the eighth bit in each 8-bit unit of data in each channel in every 6th frame in the PCM transmission format as shown in FIG. 9 and transmits them to the existing telephone network 12.

Usually, in the broadband network 11, such as a B-ISDN, a call is made according to an LAPD. However, when a call is issued to the existing telephone network 12, the LAPD-based call information must be converted to signaling information using bits A and B in the PCM transmission format. The operation of the adaptor 13 described above practically represents the conversion. The conversion can be performed by the method used between the LAPD in the conventional narrowband ISDN and the signaling bits A and B in the existing telephone network.

The existing telephone network 12 forms a transmission line similar to a common inter-station transmission line, to transmit voice data to the existing subscribers 18, 19, . . . Transmission from an Existing Subscriber to a Broadband Subscriber On receiving PCM-transmission-format data from the existing telephone network 12, the adaptor 13 removes a signaling bit from the eighth bit in every 6th frame, puts the data in cells, and applies them to the subscriber terminal equipment 22 through the transmission system 23 and the remote switching unit (BRSU) 21.

On receiving cells containing multiplexed PCM-formatted data, the subscriber terminal equipment 22 retrieves the PCM-formatted data in N channels stored in cells, accommodates each 8-bit unit of data in its memory, puts data in 8 bits separately in a cell, and sends the cell to the predetermined subscribers 17a, 17b, . . . through the remote switching unit 21. The data in cells are transmitted to the broadband network subscribers 14a, 14b, . . . through the terminal adaptors 15a, 15b . . .

In the above described embodiment, data are transmitted in the PCM digital transmission format used for inter-station transmission in the existing telephone network 12. However, it is obvious that the present invention is not limited to the PCM transmission format.

What is claimed is:

1. A telephone subscriber accommodation system in a broadband network for accommodating telephone subscribers in a broadband network by transmitting information in cells in an asynchronous transfer mode, comprising:

a terminal adaptor unit for separately putting in cells of voice data from each of said telephone subscribers accommodated in said broadband network at every predetermined sampling cycle, and for sending the cells to said broadband network;

subscriber terminal equipment for extracting at every predetermined sampling cycle and multiplexing in an existing frame format each of voice data from a plurality of subscribers accommodated in said broadband network, and for sending said cells to said broadband network; and a network adaptor unit provided between said broadband network and existing telephone network for extracting a signal obtained by multiplexing said voice data from the cells sent from said subscriber terminal equipment through said broadband network, converting the frame format of the signal multiplexed by the subscriber terminal equipment to a transmission format of said existing telephone network, and then sending the converted signal to said existing telephone network.

2. A telephone subscriber accommodation system in a broadband network according to claim 1, wherein said transmission format of said existing telephone network is a PCM transmission format.

3. A telephone subscriber accommodation system in a broadband network according to claim 2, wherein said network adaptor unit converts the signal format to the PCM transmission format of said existing telephone network and then sends the converted signal to said existing telephone network by extracting a signal obtained by multiplexing said voice data from the cells sent from said subscriber terminal equipment through said broadband network and then adding a signaling bit to said signal.

4. A telephone subscriber accommodation system in a broadband network for accommodating telephone subscribers in a broadband network by transmitting information in cells in an asynchronous transfer mode, comprising:

a terminal adaptor unit for separately putting in cells of voice data from each of said telephone subscribers accommodated in said broadband network at every predetermined sampling cycle, and for sending the cells to said broadband network;

subscriber terminal equipment for extracting at every predetermined sampling cycle and multiplexing in an existing frame format each of voice data samples stored in each of the cells from a plurality of subscribers accommodated in said broadband network, for putting each of said multiplexed existing frame format in cells, and for sending said cells to said broadband network; and a network adaptor unit provided between said broadband network and existing telephone network for extracting a signal obtained by multiplexing said voice data samples from the cells sent from said subscriber terminal equipment through said broadband network, converting the format of the signal multiplexed by the subscriber terminal equipment to a transmission format of said existing telephone network, and then sending the converted signal to said existing telephone network, wherein:

said network adaptor unit puts in cells signals sent from said existing telephone network after being obtained, by multiplexing voice data in the transmission format of said existing telephone network, and sends the cells to said broadband network, said subscriber terminal equipment isolates each sample of voice data for a plurality of subscribers accommodated in said broadband network from the cells sequentially sent by said network adaptor unit through said broadband network, puts each of isolated samples of voice data separately into a cell at each of said sampling cycles, and sends it to a plurality of subscribers accommodated in said broadband network, and said terminal adaptor unit extracts a sample of voice data from the cells sent by said subscriber terminal equipment through said broadband network at each of said every predetermined sampling cycle, and sends said sample of voice data to subscribers accommodated in said terminal adaptor unit.

5. A telephone subscriber accommodation system in a broadband network according to claim 4, wherein a transmission format of said existing telephone network is a PCM transmission format.

6. A telephone subscriber accommodation system in a broadband network according to claim 5, wherein said network adaptor unit removes a signaling bit from said signal sent from said existing telephone network after being obtained by multiplexing voice data in the PCM transmission format of said existing telephone network, and then puts said multiplexed signal in a cell to be sent to said broadband network.

7. A telephone subscriber accommodation system in a broadband network according to claim 1, wherein said subscriber terminal equipment is connected to a remote switching unit in said broadband network.

8. A telephone subscriber accommodation system in a broadband network according to claim 1, wherein a plurality of said subscriber terminal equipment is provided in said broadband network.

9. A telephone subscriber accommodation system in a broadband network according to claim 1, wherein said broadband network includes a remote switching unit connected to the subscriber terminal equipment, the remote switching unit adding a virtual channel identifier to each cell;

said subscriber terminal equipment identifies each of the cells sent by a plurality of subscribers accommodated in said broadband network using the virtual channel identifier added to each of said cells.

10. A system comprising:

a plurality of broadband subscriber units;

a plurality of terminal adapters coupled to respective broadband subscriber units, generating cells including the voice data from respective broadband subscriber units;

a broadband network coupled to the plurality of terminal adapters, including a remote switching unit receiving the cells from the plurality of terminal adapters, and including a subscriber terminal equipment coupled to the remote switching unit, receiving the cells and extracting the voice data, and generating a frame with channels corresponding to the respective broadband subscriber units, and including the voice data for the respective broadband subscriber units, and sending the frame to the remote switching unit for transmission in the broadband network;

a telephone network;

a network adaptor unit coupled between the broadband network and the telephone network, converting the frame into a format for transmission in the telephone network; and a plurality of telephone units coupled to the telephone network, at least one of the plurality of telephone units receiving the voice data from the frame converted by the network adaptor unit.

11. A method comprising the steps of:

a) receiving a plurality of cells including voice data generated by respective terminal adaptor units coupled to respective broadband subscriber units;

b) extracting voice data from the cells;

c) generating, in a broadband network, a frame including channels, the channels including the voice data;

d) transmitting the frame through the broadband network;

e) receiving the frame in a network adaptor unit;

f) converting the frame into a format for transmission in a telephone network; and g) receiving voice data included in the frame converted by the network adaptor unit, at one of a plurality of telephone units coupled to the telephone network.

* * * * *

UNITED STATES PATENT AND TRADEMARK OFFICE
CERTIFICATE OF CORRECTION

PATENT NO. : 5,521,924
DATED : May 28, 1996
INVENTOR(S) : Satoshi KAKUMA, et al.

It is certified that error appears in the above-indentified patent and that said Letters Patent is hereby corrected as shown below:

Column 5, line 26, please change "interface" to correctly read --interfaced--.

Column 6, line 9, please change "2.04" to correctly read --2.048--.

Column 7, line 64, please change "1.54" to correctly read --1.544--.

Column 8, line 57, please change "interface" to correctly read --interfaced--.

Signed and Sealed this

Fifteenth Day of October, 1996

Attest:

BRUCE LEHMAN

*Attesting Officer*   *Commissioner of Patents and Trademarks*